Feb. 15, 1949.   L. S. CHADWICK   2,461,628
CHUCK
Filed April 30, 1945   2 Sheets-Sheet 1

INVENTOR.
Lee S. Chadwick
BY
Hull & West
ATTORNEYS

Feb. 15, 1949.  L. S. CHADWICK  2,461,628
CHUCK

Filed April 30, 1945  2 Sheets-Sheet 2

INVENTOR.
Lee S. Chadwick
BY
Hull West
ATTORNEYS

Patented Feb. 15, 1949

2,461,628

UNITED STATES PATENT OFFICE 2,461,628

CHUCK

Lee S. Chadwick, Shaker Heights, Ohio, assignor to Perfection Stove Company, Cleveland, Ohio, a corporation of Ohio Application April 30, 1945, Serial No. 591,197

24 Claims. (Cl. 279—69)

This invention relates to chucks for holding an object against rotation with respect to the chuck while the object is subjected to reverse torque. Examples are the gripping of a drill or tap while boring or threading a hole, or the grasping of a piece of work in a lathe or other machine while a turning operation is being performed upon said piece.

The principal object of the invention is the provision of a chuck that is self-tightening in response to reverse torque (such torque hereinafter being referred to as the "load") and wherein the gripping force is proportional to the load. Another object is to provide a chuck that instantly resumes normal gripping pressure when relieved of the load. Another object is to provide a chuck of this character that is self-tightening when load is imposed upon it in either direction of rotation.

A further object of the invention is the provision of a chuck that is so constructed, and that operates in such manner, that a drill, tap or other object may be quickly and easily inserted into the chuck and may be caused to be held therein by a very simple and convenient manipulation of the chuck, and, with equal facility, may be removed therefrom, all without the use of a wrench or other device.

From the above it is apparent that a chuck incorporating my improvements is extremely convenient of use in that a drill, for example, may be inserted into the chuck, while the latter is attached in the usual way to the spindle of a drill press, and the chuck adjusted by hand, without the aid of any implement, to hold the drill in position. Now, as soon as the drill is engaged with a piece of work and a load, regardless of how slight it may be initially, is imposed on the drill, the chuck will tighten its grip on the drill, and the gripping action will become more and more intense as the load increases. This insures against slippage between the jaws of the chuck and the shank of the drill during the drilling operation, but as soon as the operation is completed and the load ceases, the chuck resumes its former easy hold on the drill so that the latter may be readily removed. Preferably, the chuck is constituted to function in the same manner when the direction of rotation is reversed, this being especially important in such operations as tapping.

In one of its broader aspects, the invention consists in the combination, with a suitable driving element, such as an arbor or the like, of a jaw holder axially aligned with said element; jaws slidable in the jaw holder along forwardly converging axes that intersect one another on the axis of the jaw holder, the jaws being capable of rotation with respect to said driving element; an extensible structure spacing apart the driving element and the jaw holder; means for varying the length of said extensible structure; a second extensible structure between the jaws and the driving element, and means acting to elongate the second extensible structure when the jaws are rotated with respect to the driving element, thereby to move the jaws away from the driving element and consequently tighten the jaws on an object grasped thereby as the jaws slide in the jaw holder.

Objects and advantages additional to those above mentioned will appear as I proceed to describe the invention in detail, and among which additional objects and advantages are the more general ones of simplicity of design and construction, durability, compactness, ease of assembly, and reliability.

In the accompanying drawings, wherein I have illustrated two embodiments of the invention.

For the purpose of description, the end of the chuck incorporating the jaws will be considered the front; and referring to the drawings by the use of reference characters, like ones of which designate corresponding parts in the several views, and describing, first, the form of the invention illustrated by Figs. 1 to 6, 1 denotes a driver having a relatively short, cylindrical body portion, from the front and rear ends of which project, respectively, a sleeve extension 2, and a boss 3, both being in axial alignment with said body portion. The driver is provided with a central longitudinal bore that is rearwardly tapered throughout the length of the boss 3 to provide a socket 4 for the reception of the correspondingly tapered end of an arbor A of common form. The bore of the driver is of minimum diameter immediately forwardly of the socket 4, and beyond this restricted area is enlarged throughout the remainder of its length. From its rear end, the outside diameter of the boss 3 increases for a portion of its length in steps, providing shoulders 5 and 6 between which is a cylindrical bearing portion 7, and forwardly of the shoulder 6 the boss is sharply reduced in order to leave a relatively broad annular face on the rear side of the body portion of the driver.

Journaled on the sleeve extension 2 is a cylindrical thrust element 10 having a circumferential groove 11 in its peripheral surface and, in its end remote from the body portion of the driver, radial guideways 12, of which there are three that are equally spaced apart about the element, according to the present embodiment. The guideways 12 desirably consist of cylindrical bores that open, through slots, through the front annular face of the thrust element.

The opposed annular faces of the body portion of the driver 1 and the thrust element 10 are provided with arcuate depressions 13 and 14, respectively (see Fig. 6), that are deepest at their longitudinal centers and gradually diminish in depth toward their ends thereby to form, in said faces, opposed cam surfaces. As appears from Fig. 3, there are three such depressions equally spaced apart about the thrust element, and it will be understood that the depressions of the driver correspond to those of the thrust element in number and location. Between the opposed cam surfaces of the driver and thrust element are rotary members or balls 15. These rotary members or balls 15 are held in properly spaced relation to one another by a retainer 16 in the form of an annular plate having holes 17 for said members or balls.

The body portion of the driver and the thrust element have formed in their peripheral surfaces, three relatively wide, shallow, longitudinal channels equally spaced circumferentially of said parts, those of the driver being designated 18 and those of the thrust element 19, the latter channels interrupting the previously mentioned circumferential groove 11.

20 designates springs that are formed from resilient wire to provide, in each, parallel legs 21 that join, at their rear ends, loops 22, and between said loops is a strut 23. Said strut is constructed of the central portion of the wire and is turned laterally out of the plane of said loops, as will appear from Figs. 1 and 4. The terminal portions of the wire, at the ends of the legs opposite the loops 22, are turned outwardly to provide feet 24, and said feet and the loops 22 are curved transversely to correspond to the cylindrical contour of the driver and thrust element. Also, the spacing of the feet 24 from the front sides of the loops 22 is slightly greater than the normal spacing of the groove 11 from the rear annular face of the body portion of the driver, which face is engaged, as will be seen from Figs. 1 and 2, by the struts 23 of the springs 20, while the feet 24 occupy the groove 11. Installed in this manner, the springs are under tension. It will be seen, therefore, that said springs tend to draw the thrust element and driver toward each other to maintain them in constant contact with the balls 15, and to hold the driver and thrust element in normal orientated relation to each other with their grooves 16 and 17 in alignment and with the balls 15 in mid position in the deepest portions of the depressions 13 and 14.

25 is a jaw holder having a rear flange 26 of approximately the same diameter as the thrust element and which joins, through a cylindrical portion 27, a frusto conical front portion. A hollow cylindrical shank 28 of the jaw holder occupies the bore of the sleeve extension 2, and a pin 29, which is supported through its head 30 that fits tightly in the portion of the bore of the driver that is of smallest diameter, projects forwardly into the bore of the shank 28. An axial recess 31 is formed in the front end of the jaw holder, and surrounding and opening into said recess are forwardly converging bores or guideways 32. Jaws 35 are slidable within said guideways and at their inner ends are provided with heads 36 that are reciprocable in the previously mentioned guideways 12 of the thrust element.

Surrounding the driver 1, thrust element 10 and the rear end of the jaw holder 25, is an inner sleeve 40 that is externally threaded from its rear end forwardly to a little beyond its longitudinal center, and the front end of said sleeve is surrounded by an inwardly directed flange between which and the flange 26 of the jaw holder 25 are anti-friction bearings 42, shown as balls. Extending along one side of the inner sleeve 40, interiorly and longitudinally thereof, is a key 43, shown in perspective in Fig. 5. This key has lateral projections 44 which fit within apertures in the wall of the sleeve and serve to prevent longitudinal movement of the key with respect to the sleeve. The driver has a keyway, corresponding in cross sectional area substantially with the key 43, that is occupied by said key, while the end portion of the key forwardly of the driver occupies a relatively wide slot in the peripheral surface of the thrust element 10. By reason of this construction, the driver and inner sleeve are locked together against relative rotation, while the thrust element is permitted limited rotative movement with respect to the driver and sleeve. The key 43 serves the additional purpose of retaining the jaw holder 25 at the front end of the sleeve with its flange 26 in proper engagement with the anti-friction bearings 42.

46 is an outer sleeve having a reentrant portion at its rear end which is journaled on the bearing part 7 of the boss 3. Said reentrant portion is recessed to the depth of the shoulder 5 and secured to the rear, reduced end of the boss 3, as by a pressed fit thereon, and occupying the recess of said reentrant portion, is a collar 47. Thus, the outer sleeve is rotatably but non-reciprocably connected to the driver, and it is shown as having bearing adjacent its forward end on the adjacent portions of the inner sleeve 40. The outer sleeve is provided with an internal thread that cooperates with the externally threaded portion of the inner sleeve.

While my invention is adapted for use as either a tool holder or a work holder, I shall, for the purpose of describing its operation, consider it as used for holding a tool, such as a drill or tap.

As pointed out above, the socket 4 of the driver 1 is tapered for the reception of the correspondingly tapered end of the arbor A by which the chuck may be connected to the spindle of a drill press or other machine. However, it will be understood that the socket 4 may be threaded, especially in the smaller sizes of the chuck, for attachment to the threaded end of the spindle of a portable power unit, such as an electric hand drill. With the chuck connected to the spindle of a drill press, for example, it will rotate bodily therewith and, assuming that it is rotating in a reverse direction to that required for drilling or tapping, the outer sleeve 45 may be held so as to stop or retard the rotation of said sleeve, while the inner sleeve, and all parts enclosed thereby, continue to rotate with the spindle of the press. The exterior surface of the outer sleeve may be knurled or fluted to facilitate the holding of said sleeve. While the driver 1 is incapable of movement longitudinally of the outer sleeve 45, as is also the thrust element 10 except to a very limited extent, as hereinbefore pointed out, the inner sleeve 40, with its key 43, are fed forwardly within the outer sleeve through the cooperation of the interengaging threaded portions of the two sleeves; and as the inner sleeve advances it carries with it, due to the key 43, the jaw holder 25. Because of the rearward divergence of the guideways 32 of the jaw holder, the jaws 35 will be shifted radially outwardly, being themselves held against longitudinal movement by cooperation of their heads 36 with the radial guideways 12 of the thrust element.

When the jaws have been opened sufficiently, the hold on the outer sleeve 45 is released, the machine is stopped, and the shank of the tool is inserted into the opening of the jaws. The machine is then started with its spindle rotating in the opposite direction—that is to say, in the direction required for a boring or tapping operation. Now, by holding the outer sleeve 45 against turning, or so as to retard its rotation, the inner sleeve, with the jaw holder, is caused to move rearwardly and the jaws 35 to contract and assume normal holding engagement with the shank of the tool. The foregoing operation can, of course, be performed when the machine is at rest, by simply turning the outer sleeve in opposite directions.

It will be understood that when the drill or tap (not shown) is engaged with a piece of work, load is imposed upon the tool which is immediately transmitted through the jaws 35, to the thrust element 10, causing slight regression thereof with respect to the driver 1 and in opposition to the springs 20, such action displacing the balls 15 toward the opposite ends of the respective cam surfaces of the thrust element and driver. As a consequence, the thrust element 10 is urged forwardly, as is also the jaws 35, causing the latter, by reason of the forward convergence of the guideways 32, to increase their grip on the shank of the tool. This intensified gripping action will prevail during the entire drilling or threading operation, but when such operation is completed and the load on the tool ceases, the thrust element 10 will, under the action of the springs 20, resume its normal relation to the driver 1 and the jaws will bear with normal pressure on the shank of the tool. In the shifting of the thrust element from its normal position with respect to the driver, the legs 21 of each of the springs 20 approach each other as the channels 16 and 17 of the driver and thrust element shift out of alignment. Attention is also called to the fact that the length of the legs 21 (or, in other words, the distance between the feet 24 and the front sides of the loops 22) relative to the normal spacing of the circumferential groove 18 of the thrust element, wherein said feet are engaged, from the rear face of the body portion of the driver 1 against which the strut 23 of the spring bears, is such as will permit the thrust element to move axially of and away from the driver during the self-tightening action above described. As already mentioned, when the load ceases, relaxation of the springs 20 cause the driver and thrust element to resume normal relationship.

It is evident from the foregoing, taking into account that the opposed cam surfaces of the driver and thrust element approach each other from their centers in both directions toward their ends, that the self-tightening of the jaws will occur if load is imposed on the tool during its retraction from the work.

Referring now to Figs. 7 to 13, wherein is illustrated a modified form of the invention, 50 denotes a driver in the form of a cylindrical body having parts of different diameters and from the front and rear ends of which project, respectively, a sleeve extension 51 and a boss 52, both being in axial alignment with said body. The driver is provided with a central longitudinal bore that tapers rearwardly from a shoulder 53 to provide a socket 54 for the reception of the correspondingly tapered end of an arbor A' of usual form. The bore of the driver is of reduced and uniform diameter forwardly of the shoulder 53.

Figures 7, 8, 9, 10, 11, 12, 13:
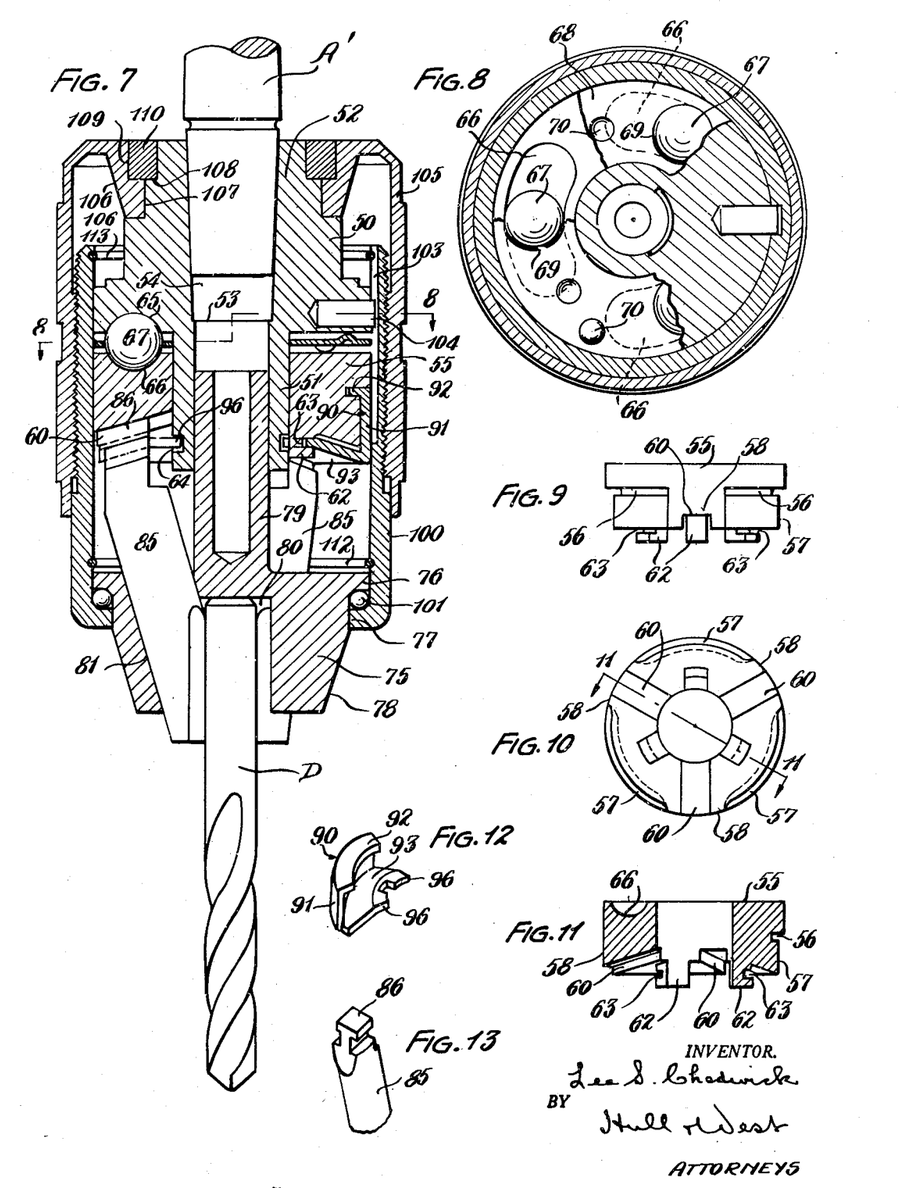
Fig. 7 is a view, similar to Fig. 1, of a modified form of the invention.
Fig. 8 is a transverse section through the same, in the staggered plane indicated by the line 8—8 of Fig. 7.
Figs. 9, 10 and 11 are, respectively, a side elevation, a bottom plan view, and a central section, of the thrust element of the present modification, the latter view being taken on the line 11—11 of Fig. 10.
Fig. 12 is a perspective view of one of the jaw retainers which is individual to the instant construction.
Fig. 13 is a fragmentary perspective view of one of the jaws showing the T-head thereof which cooperates with the retainers.

Journaled on the sleeve extension 51 is an annular thrust element 55, shown in detail in Figs. 9, 10 and 11. Extending about the thrust element in suitably spaced parallel relation to its rear end, and in circumferentially spaced relation to each other, are three segmental grooves 56, and between each groove and the front end of the thrust element, the radius of the element is reduced, providing shallow segmental pockets in the periphery of the element, said pockets being designated 57. It is evident from the foregoing that the thrust element remains of maximum radius between the grooves 56 and pockets 57, thereby to provide lands 58. The front end of the thrust element is symmetrically formed with a shallow frusto-conical recess that is interrupted centrally of the longitudinal zone of each of the lands 58 by a radial guideway 60, the bottom of which is inclined outwardly and forwardly to correspond to the taper of the front end of the thrust element. Midway between the inner ends of the guideways 60 are lugs 62 that extend beyond the front end of the element and are formed with transverse grooves 63 on their outer sides. In the plane of the grooves 63, the sleeve extension 51 of the driver 50 is provided with a somewhat wider circumferential groove 64.

The front and rear annular faces, respectively, of the driver 50 and the thrust element 55, are provided with arcuate depressions 65 and 66 that are deepest at their longitudinal centers and gradually diminish in depth toward their ends thereby to form, in said faces, opposed cam surfaces, corresponding to those designated 13 and 14 in the first described form of the invention. As shown in Fig. 8, there are three such depressions equally spaced apart about the thrust element, and it will be understood that the depressions of the driver correspond to those of the thrust element in number and location. Between the opposed cam surfaces of the driver and thrust element are rotary members or balls 67. Said members or balls are kept in proper relation to one another at all times by a retainer 68 in the form of an annular plate having apertures 69 for the accommodation of the rotary members or balls and, preferably, about midway between said apertures, the retainer is provided with knobs 70 on its opposed faces, the same being formed by reverse depressions in the plate. The knobs 70 serve to space the retainer approximately midway between the opposed annular faces of the driver 50 and the thrust element 55.

75 denotes a jaw holder having a rear flange 76 of a diameter substantially equal to the maximum diameter of the thrust element 55. Said rear flange joins, through a cylindrical portion 77, a frusto-conical front portion 78. A rearwardly extending cylindrical shank 79 of the jaw holder occupies the bore of the sleeve extension 51 of the driver 50. An axial recess 80 is formed in the front end of the jaw holder, and surrounding and opening into said recess are forwardly converging bores or guideways 81, the axes of which intersect one another on the axis of the jaw holder. Jaws 85 are slidable in said guideways and at their rear ends are provided with T-heads 86 that slidably fit the guideways 60 of the thrust element.

The jaws are coupled to the thrust element 55, with their heads slidable in the guideways 60, by jaw retainers 90, one of which is shown in perspective in Fig. 12. Each jaw retainer consists of a cylindric wall 91 having an inturned flange 92 at its rear end, and at its front end, joins a segmental wall 93 that tapers inwardly and rearwardly for a suitable distance and then continues in a plane normal to the axis of the cylindric wall 91. When the thrust element and jaw retainers (of which there are three) are in assembled condition, the cylindric walls 91 of the retainers occupy the pockets 57 of the thrust element with the flanges 92 engaged in the grooves 56. Inner edge portions 96 of the segmental walls 93 of the jaw retainers project into the groove 64 of the sleeve extension 51 while the lugs 62 of the thrust element occupy notches in said walls 93 between the portions 96 thereof, the parts of said walls that define the bottoms of the notches fitting into the grooves 63 of said lugs. With the parts so assembled, the radial edges of the segmental walls 93 of the jaw retainers overlie the front sides of the heads 86 of the jaws 85, thereby to slidably connect the jaws to the thrust element.

Surrounding the driver 50, thrust element 55 and the rear end of the jaw holder 75, is an inner sleeve 100 that is externally threaded from its rear end forwardly to a little beyond its longitudinal center, and the front end of said sleeve is surrounded by an inwardly directed flange between which and the flange 76 of the jaw holder 75 are anti-friction bearings 101, shown as balls. Extending along one side of the inner sleeve 100, interiorly and longitudinally thereof, in a keyway 103 into which projects the outer end of a key or pin 104 that occupies a radial recess in the driver 50. By this means the driver and inner sleeve are locked against relative rotation, while the latter remains capable of movement longitudinally of the driver and thrust element 55. 105 denotes an outer sleeve having a reentrant portion 106 at its rear end which is journaled on a bearing part 107 of the boss 52 of the driver 50. Said reentrant portion is recessed to the depth of a shoulder 108 on said boss, and secured, as by a driving fit, on the reduced rear end of the boss, and occupying an annular recess 109 of said reentrant portion 106, is a collar 110. Thus, the outer sleeve is rotatably but non-reciprocably connected to the driver 50; and it is shown as having bearing adjacent its forward end on the smooth front end portion of the inner sleeve 100. The outer sleeve is provided with an internal thread that cooperates with the externally threaded portion of the inner sleeve. The jaw holder is retained within the forward end of the inner sleeve by a resilient expanding ring 112 that is adapted to be snapped into an internal circumferential groove of said sleeve during the course of assembly, and a similar resilient expanding ring 113 is engaged within a circumferential groove that surrounds the interior of the inner sleeve 100 adjacent the rear end thereof, the latter ring serving to limit forward movement of the inner sleeve by contact with the portion of greatest diameter of the driver 50.

Figure 1:
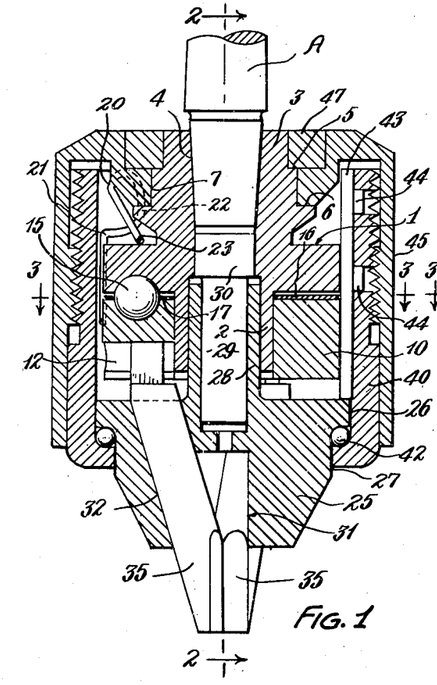
Fig. 1 represents a central longitudinal section through one form of my improved chuck, the plane of section being indicated by the line 1—1 of Fig. 2.
Figure 2:
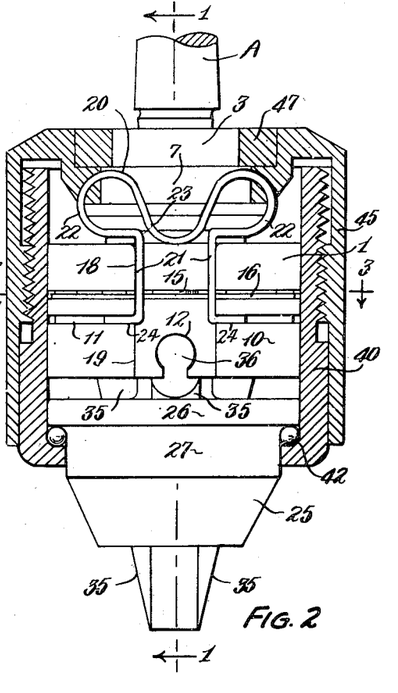
Fig. 2 is a section at right angles to Fig. 1, as indicated by the line 2—2 of the former view, but showing the driver, thrust element, jaw holder and other parts in elevation.
Figure 3:
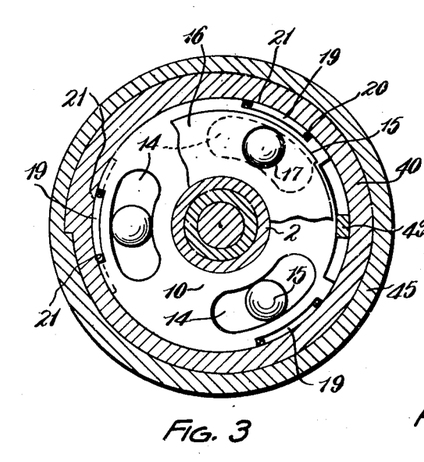
Fig. 3 is a transverse section on the lines 3—3 of Figs. 1 and 2, looking in the direction of the arrows.
Figure 4:
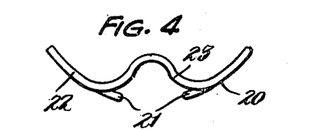
Fig. 4 is a plan view of one of the springs that yieldingly retains the driver and thrust element in normal relation to each other in the construction illustrated in Figs. 1 to 6.
Figure 5:
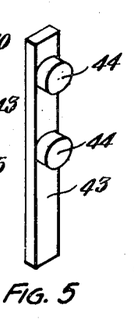
Fig. 5 is a perspective view of the key that locks the driver and inner sleeve against relative rotation.
Figure 6:
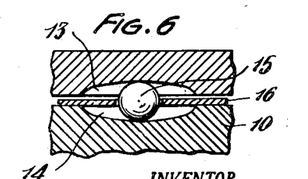
Fig. 6 is a sectional detail showing one set of opposed cam faces of the driver and thrust element with the cooperating ball between them.

The manner of use and operation of the present form of the invention will be readily understood from the description of the operation of the first form. However, it may be well to explain that, in Fig. 7, the chuck is shown as grasping the shank of a drill D. As a consequence, the inner sleeve 100 and jaw holder 75 are projected forwardly a considerable distance beyond the position the corresponding parts of the previously described embodiment occupy as the latter is illustrated in Figs. 1 and 2 where the inner sleeve is retracted as far as possible within the outer sleeve and the jaws are entirely together.

With reference to the modification, it will be observed that the load sustaining surfaces of the guideways 60, which engage the heads of the jaws 85, are in planes normal to the axes of said jaws. This insures the maximum power of the thrust element being imposed upon the jaws when the parts are under load. Attention is also directed to the fact that in the regions of greatest compression the thrust element is reinforced by the lands 58. As a manufacturing expedient, the jaw retainers 90 are provided, as otherwise considerable more machine work would be required on the thrust element, as it would be necessary to cut T-slots in said element for the accommodation of the heads 86 of the jaws 85. Inasmuch as very little strain is imposed upon the jaw retainers 90, they may consist of sheet metal stampings, die castings, or the like.

The ball retainers 16 and 68 of the respective first and second forms of the invention insure against such disarrangement of the balls 15 and 67 as would result in the parts becoming locked when the chucks are used in positions wherein their axes are other than vertical, especially horizontal.

While I have described, in detail, practical and desirable embodiments of my invention, I wish it to be understood that, in its broader aspects, the invention is not limited to the structural details shown and described.

Having thus described my invention, what I claim is:

1. In a chuck, the combination of a driver, a thrust element, and a jaw holder, all axially aligned with one another, jaws supported by the jaw holder for movement toward and from one another and cooperating at their rear ends with the thrust element, an inner sleeve surrounding the driver, thrust element and the rear end of the jaw holder and with respect to which the jaw holder and thrust element are capable of limited rotation, the inner sleeve being splined to the driver, means restraining the jaw holder from movement longitudinally of the inner sleeve, an outer sleeve surrounding the inner sleeve and threadedly engaged therewith and rotatably but non-reciprocably connected to the driver, means tending to retain the driver and thrust element in normal relative position, and means responsive to resistance of said element to rotation and a consequential regression of the element with respect to the driver for urging said element toward the jaw holder thereby to increase the gripping force of the jaws on an object grasped thereby.

2. In a chuck, the combination of a driver, a thrust element, and a jaw holder, all in axial alignment with one another, jaws supported by the jaw holder for movement toward and from one another and cooperating at their rear ends with the thrust element, an inner sleeve surrounding the driver, the thrust element and the rear portion of the jaw holder and capable of limited rotation with respect to said element and jaw holder, a key secured to the inside of said sleeve and extending longitudinally thereof and arranged for engagement with the jaw holder for maintaining the latter adjacent the front of said sleeve, the driver having a keyway in its peripheral surface within which the key has a sliding fit and the thrust element having a relatively wide peripheral slot for the accommodation of said key, the inner sleeve having external threads, an internally threaded outer sleeve surrounding the inner sleeve and threadedly engaged therewith, said outer sleeve being rotatably but non-reciprocably connected to the driver beyond the rear end of the inner sleeve, and means responsive to resistance of said element to rotation and a consequential regression of the element with respect to the driver for urging said element toward the jaw holder thereby to increase the gripping force of the jaws on an object grasped thereby.

3. In a chuck, the combination of a driver having a cylindrical body portion from the front and rear ends of which project, in axial alignment with said body portion, a sleeve extension and a boss, respectively, the boss having an axial socket opening through its rear end, a cylindrical thrust element mounted on the sleeve extension of the driver for limited rotative and longitudinal movement with respect to the driver, the adjacent ends of the body portion of the driver and the thrust element having opposed circumferentially extending cam surfaces that approach each other in both directions from the longitudinal centers of said cam surfaces, a rotary member interposed between said cam surfaces, means tending to retain the element and driver in normal relation to each other, the body portion of the driver and the thrust element having peripheral keyways, the keyway of said element being wider than that of the driver, an inner sleeve surrounding the driver and the thrust element, a jaw holder within the front of said sleeve, a key attached to the inner side of said sleeve and extending longitudinally thereof and having a sliding fit within the keyway of the driver and projecting forwardly through the keyway of the thrust element and arranged at its forward end to engage the jaw holder for retaining the latter adjacent the front of said sleeve, jaws supported by the jaw holder for movement toward and from one another and cooperating at their rear ends with the thrust element, the inner sleeve being externally threaded, and an internally threaded outer sleeve surrounding the inner sleeve and threadedly engaged therewith and rotatably and non-reciprocably connected adjacent its rear end to the boss of the driver.

4. In a chuck, the combination of a driver having a cylindrical body portion from the front and rear ends of which project a sleeve extension and a boss, respectively, said boss having a bearing portion spaced from its rear end and provided with an axial socket opening through said end, a cylindrical thrust element of substantially the same diameter as said body portion journaled on the sleeve extension of the driver, said thrust element being provided with radial guideways that open along one of their sides through the front end of the element and which guideways are enlarged inwardly of their open sides, a jaw holder having an axial shank that is rotatable and reciprocable within the sleeve extension of the driver and provided with forwardly converging guideways, jaws slidably supported within said guideways of the jaw holder and having heads slidable in the guideways of the thrust element, the adjacent ends of the driver and thrust elment having sets of opposed cam surfaces, the cam surfaces of each set approaching each other in both directions circumferentially of said ends from the longitudinal centers of said cam surfaces, rotary members interposed between said opposed cam surfaces, the driver and thrust element having peripheral longitudinal channels and the thrust element being provided with a circumferential groove which intersects said channels, spring members including laterally spaced legs that extend along the sides of said channels and have outwardly extended feet that occupy said circumferential groove, the ends of said spring members opposite the feet being formed to provide readily yielding parts including struts which bear against the rear end of the body portion of the driver, said body portion and the thrust element having aligned keyways, the keyway of the thrust element being wider than that of said body portion, an externally threaded inner sleeve surrounding the driver, thrust element and rear end of the jaw holder, a key fixed to the inner side of said sleeve and slidably engaged within the keyway of said body portion and projecting forwardly through the keyway of the thrust element and having its forward end disposed in such relation to the jaw holder as to retain the latter in the forward end of said sleeve, and an internally threaded outer sleeve surrounding the inner sleeve and threadedly engaged therewith and having its rear end extended inwardly over the corresponding end of the inner sleeve and journaled on the aforesaid bearing portion of the boss of the driver.

5. In a chuck, the combination of a driver having a cylindrical body portion from the front and rear ends of which project a sleeve extension and a boss, respectively, said boss having a bearing portion spaced from its rear end and provided with an axial socket opening through said end, a cylindrical thrust element of substantially the same diameter as said body portion journaled on the sleeve extension of the driver, said thrust element being provided with radial guideways that open through its front end, a jaw holder having a hollow axial shank that is rotatable and reciprocable within the sleeve extension of the driver, said holder being provided with forwardly converging guideways, jaws slidably supported within said guideways of the jaw holder and having heads slidable in the guideways of the thrust element, the adjacent ends of the driver and thrust element having sets of opposed cam surfaces, the cam surfaces of each set approaching each other in both directions circumferentially of said ends from the longitudinal centers of said cam surfaces, rotary members interposed between said cam surfaces, spring members tending to retain the thrust element and driver in normal relation to each other, the body portion of the driver and the thrust element having aligned keyways, the keyway of the thrust element being wider than that of said body portion, a key slidably engaged within the keyway of said body portion and projecting forwardly through the keyway of the thrust element and having its forward end in abutting relation to the jaw holder, an externally threaded inner sleeve surrounding the driver, thrust element and rear end of the jaw holder and to the inner side of which the aforesaid key is fastened, and an internally theraded outer sleeve surrounding the inner sleeve and threadedly engaged therewith and having its rear end extended inwardly over the corresponding end of the inner sleeve and journaled on the aforesaid bearing portion of the boss of the driver, the driver having an axial bore continuing forwardly from the aforesaid socket, and a pin secured at its rear end within said bore and projecting forwardly into the hollow shank of the jaw holder.

6. In a chuck, the combination of a driver, a thrust element, and a jaw holder, all rotatable about a common axis, the thrust element being capable of limited longitudinal and rotative movement with respect to the driver, jaws supported by the jaw holder for movement toward and from one another and cooperating at their rear ends with the thrust element, the jaw holder and thrust element being relatively movable toward each other to cause the jaws to assume gripping position and away from each other to cause the jaws to open, means for effecting said relative movement between the jaw holder and thrust element, the driver and thrust element having on their adjacent ends opposed cam surfaces that are elongated circumferentially of said ends and which cam surfaces approach each other in both directions from their longitudinal centers, and a rotary member between the opposed cam surfaces of the driver and thrust element.

7. In a chuck, the combination of a driver, a thrust element, and a jaw holder, all rotatable about a common axis, the thrust element being capable of limited longitudinal and rotative movement with respect to the driver, jaws supported by the jaw holder for movement toward and from one another and cooperating at their rear ends with the thrust element, the jaw holder and thrust element being relatively movable toward each other to cause the jaws to assume gripping position and away from each other to cause the jaws to open, means for effecting said relative movement between the jaw holder and thrust element, the driver and thrust element having on their adjacent ends opposed cam surfaces that are elongated circumferentially of said end and which cam surfaces approach each other in both directions from their longitudinal centers, a rotary member between the opposed cam surfaces of the driver and thrust element, and resilient means tending to urge the driver and thrust element toward each other.

8. In a chuck, the combination of a driver, a thrust element, and a jaw holder, all rotatable about a common axis, the thrust element being capable of limited longitudinal and rotative movement with respect to the driver, jaws supported by the jaw holder for movement toward and from one another and cooperating at their rear ends with the thrust element, the jaw holder and thrust element being relatively movable toward each other to cause the jaws to assume gripping position and away from each other to cause the jaws to open, means for effecting said relative movement between the jaw holder and thrust element, the driver and thrust element having on their adjacent ends opposed cam surfaces that are elongated circumferentially of said ends and which approach each other in both directions from their longitudinal centers, a rotary member between the opposed cam surfaces of the driver and thrust element, and resilient means tending to retain the driver and thrust element in normal orientated relation to each other.

9. In a chuck, the combination of a driver, a thrust element, and a jaw holder, all axially aligned with one another, jaws supported by the jaw holder for movement toward and from one another and cooperating at their inner ends with the thrust element, an inner sleeve surrounding the driver, thrust element and the rear end of the jaw holder and with respect to which the jaw holder and thrust element are capable of limited rotation, the inner sleeve being splined to the driver, means restraining the jaw holder from movement longitudinally of the inner sleeve, an outer sleeve surrounding the inner sleeve and threadedly engaged therewith and rotatably but non-reciprocably connected to the driver, and means responsive to resistance of said thrust element to rotation and a consequential regression of the element with respect to the driver for urging said element toward the jaw holder thereby to increase the gripping force of the jaws on an object grasped thereby.

10. In a chuck, the combination of a driver having a cylindrical body portion from the front end of which projects an axial extension, an annular thrust element rotatable about said extension for limited rotative and longitudinal movement with respect to the driver, the adjacent ends of the body portion of the driver and the thrust element having opposed cam surfaces, a rotary member interposed between said cam surfaces, an inner sleeve surrounding the driver and the thrust element and splined to the former, a jaw holder rotatable within the front end of said sleeve, stop means constraining the jaw holder against movement axially of the sleeve, jaws supported by the jaw holder for movement toward and from one another and cooperating at their rear ends with the thrust element, the inner sleeve being externally threaded, and an internally threaded outer sleeve surrounding the inner sleeve and threadedly engaged therewith and rotatably and non-reciprocably connected adjacent its rear end to the driver.

11. In a chuck, the combination of a driver having a cylindrical body portion from the front end of which projects a sleeve extension, an annular thrust element rotatable on said sleeve extension for limited rotative and longitudinal movement with respect to the driver, the adjacent ends of the body portion of the driver and the thrust element having opposed cam surfaces, a rotary member interposed between said cam surfaces, an inner sleeve surrounding the driver and the thrust element and splined to the former, a jaw holder rotatable within the front end of said sleeve and having a smooth shank telescoping in the sleeve extension of the driver and oscillable therein, stop means constraining the jaw holder against movement axially of the sleeve, jaws supported by the jaw holder for movement toward and from one another and cooperating at their rear ends with the thrust element, the inner sleeve being externally threaded, and an internally threaded outer sleeve surrounding the inner sleeve and threadedly engaged therewith and rotatably and non-reciprocably connected adjacent its rear end to the driver.

12. In a chuck, the combination of a driver having a cylindrical body portion, an annular thrust element axially aligned therewith and being capable of limited rotative and longitudinal movement with respect to the driver, the adjacent ends of the body portion of the driver and the thrust element having a series of circumferentially spaced opposed cam surfaces, rotary members interposed between the cam surfaces of said body portion and the thrust element, a retainer between the body portion and thrust element for maintaining the rotary members in a circumferentially spaced relation to one another corresponding to that of said cam surfaces, an inner sleeve surrounding the driver and the thrust element, a jaw holder rotatable within the front of the sleeve, stop means constraining the jaw holder against movement axially of the sleeve, the driver and said sleeve having, on the one hand, a key and on the other a keyway into which the key projects, jaws supported by the jaw holder for movement toward and from one another and cooperating at their rear ends with the thrust element, the inner sleeve being externally threaded, and an internally threaded outer sleeve surrounding the inner sleeve and threadedly engaged therewith and rotatably and non-reciprocably connected adjacent its rear end to the driver.

13. In a chuck, the combination of a driver having a cylindrical body portion, an annular thrust element axially aligned therewith and being capable of limited rotative and longitudinal movement with respect to the driver, the adjacent ends of said body portion and thrust element having a series of circumferentially spaced opposed cam surfaces, rotary members interposed between the cam surfaces of said body portion and the thrust element, a retainer between the body portion and thrust element for maintaining the rotary members in a circumferentially spaced relation to one another corresponding to that of the cam surfaces of the driver and thrust element, said retainer having projections that space it from said body portion and from the thrust element, an inner sleeve surrounding the driver and the thrust element, a jaw holder rotatable within the front of the sleeve, stop means constraining the jaw holder against movement axially of the sleeve, the driver and said sleeve having, on the one hand, a key and on the other a keyway into which the key projects, jaws supported by the jaw holder for movement toward and from one another and cooperating at their rear ends with the thrust element, the inner sleeve being externally threaded, and an internally threaded outer sleeve surrounding the inner sleeve and threadedly engaged therewith and rotatably and non-reciprocably connected adjacent its rear end to the driver.

14. In a chuck, the combination of a driver, a thrust element and a jaw holder, all rotatable about a common axis, jaws slidable in the jaw holder along forwardly converging axes that intersect one another on the axis of the jaw holder, the thrust element and jaw holder being non-rotatable with respect to each other while being capable of limited rotation with respect to the driver, the jaw holder and thrust element being relatively movable toward each other to cause the jaws to assume gripping position and away from each other to cause the jaws to open, means for effecting said relative movement between the jaw holder and thrust element, said thrust element having radial guideways in its front face and the jaws having undercut heads at their rear ends that are slidable in said guideways, the open side of the guideways being no less in width than the maximum width of said heads, jaw retainers having parts interengaged with parts of the thrust element and other parts underlying the heads of the jaws for coupling the jaws to the thrust element, and means responsive to resistance of the thrust element to rotation and a consequential regression of said element with respect to the driver for urging said element toward the jaw holder thereby to increase the gripping force of the jaws on an object grasped thereby.

15. In a chuck, the combination of a driver, a thrust element and a jaw holder, all rotatable about a common axis, jaws slidable in the jaw holder along forwardly converging axes that intersect one another on the axis of the jaw holder, the thrust element and jaw holder being non-rotatable with respect to each other while being capable of limited rotation with respect to the driver, the jaw holder and thrust element being relatively movable toward each other to cause the jaws to assume gripping position and away from each other to cause the jaws to open, means for effecting said relative movement between the jaw holder and thrust element, said thrust element having radial guideways in its front face, the jaws having heads at their rear ends that are slidable in said guideways, jaw retainers attached at their rear ends to the thrust element and having segmental walls overlying the front of said element and the radial edges of which walls underlie the sides of the jaw heads, and means responsive to resistance of the thrust element to rotation and a consequential regression of said element with respect to the driver for urging said element toward the jaw holder thereby to increase the gripping force of the jaws on an object grasped thereby.

16. In a chuck, the combination of a driver, a thrust element and a jaw holder, all rotatable about a common axis, jaws slidable in the jaw holder along forwardly converging axes that intersect one another on the axis of the jaw holder, the thrust element and jaw holder being non-rotatable with respect to each other while being capable of limited rotation with respect to the driver, the jaw holder and thrust element being relatively movable toward each other to cause the jaws to assume gripping position and away from each other to cause the jaws to open, means for effecting said relative movement between the jaw holder and thrust element, the thrust element having an outwardly flaring front face substantially normal to the axes of the jaws, the thrust element having in its front face radial channels in the planes of the jaws and whose bottom walls are substantially parallel to the adjacent surface portions of said front face, the jaws having heads at their rear ends which are slidable within said channels, jaw retainers for coupling the jaws to the thrust element, each retainer consisting of a cylindric wall, a flange extending inwardly from the rear end of said wall and a segmental wall projecting inwardly from the front end of the former wall and bearing substantially the same angular relation thereto as the front face of the thrust element bears to the peripheral surface thereof, the thrust element having a circumferentially extending groove into which the flange of a retainer is engaged and being reduced in radius forwardly of said groove throughout the width of said cylindric wall to provide a segmental pocket for the accommodation of the said cylindric wall, the opposed lateral edges of the segmental walls of adjacent retainers underlying the sides of the jaw heads, and means responsive to resistance of the thrust element to rotation and a consequential regression of said element with respect to the driver for urging said element toward the jaw holder thereby to increase the gripping force of the jaws on an object grasped thereby.

17. In combination, a driving element, a jaw holder axially aligned therewith, jaws slidable in the jaw holder along forwardly converging axes that intersect one another on the axis of the jaw holder, the jaws being capable of limited rotation with respect to said element, an extensible casing spacing apart the driving element and the jaw holder, means for varying the length of said casing, an extensible structure enclosed by the casing and disposed between the jaws and the driving element, and means responsive to and wholly dependent for its action upon resistance of the jaws to turning for causing elongation of the second extensible structure when the jaws are rotated with respect to the driving element as a result of torque resistance being imposed upon the jaws, thereby to move the jaws away from the driving element and consequently tighten the jaws on an object grasped thereby as the jaws slide in the jaw holder.

18. In combination, a driving element, a jaw holder axially aligned therewith, jaws slidable in the jaw holder along forwardly converging axes that intersect one another on the axis of the jaw holder, an extensible casing spacing apart and connecting the driving element and the jaw holder, means for varying the length of said casing, an extensible structure by which the jaws are spaced from the driving element, said extensible structure containing two members capable of limited rotation with respect to each other, one of said members being attached to the driving element and the other attached to the jaws, means for increasing the distance between said members when one is rotated with respect to the other and which means is wholly dependent for its action upon relative rotation of said members, whereby regression of the one to which the jaws are attached with respect to the other member will cause tightening of the jaws on an object grasped thereby.

19. In a chuck, the combination of a driver, a jaw holder axially aligned therewith, jaws slidable in the jaw holder along forwardly converging axes that intersect one another on the axis of the jaw holder, the jaws being capable of rotation with respect to said driver, a sleeve rotatable but restrained against axial movement with respect to the jaw holder and axially movable but restrained against rotation with respect to the driver, a second sleeve threaded to the first sleeve and rotatable but restrained against axial movement with respect to the driver, and power transmitting means between the jaws and driver permitting radial movement and limited axial and rotary movement of the jaws with respect to the driver and causing the jaws to slide forwardly in the jaw holder when the jaws are rotated with respect to the driver.

20. A chuck incorporating a driver, a jaw holder axially aligned therewith, jaws slidable in the jaw holder along forwardly converging axes that intersect one another on the axis of the jaw holder, a sleeve rotatable but restrained against axial movement with respect to the jaw holder and axially movable but restrained against rotation with respect to the driver, a second sleeve threaded to the first sleeve and rotatable but restrained against axial movement with respect to the driver, a member to which the jaws are attached in such manner as to permit them to move radially with respect to said member, and means acting under resistance of said member to rotation and a consequential regression of the member with respect to the driver to cause axial movement of the member with respect to the driver and a resultant tightening of the jaws.

21. A chuck incorporating a driver, a jaw holder axially aligned therewith, jaws slidable in the jaw holder along axes intersecting one another on the axis of the jaw holder, the jaws being capable of rotation with respect to the driver, a sleeve rotatable but restrained against axial movement with respect to the jaw holder and axially movable but restrained against rotation with respect to said driver, a second sleeve threaded to the first sleeve and rotatable but restrained against axial movement with respect to the driver, cam means interposed between the driver and the jaws and rotatable with said jaws, the cam means including a member having a cam surface inclined to a plane normal to the axis of the jaw holder and a part cooperating with said surface and immovable with respect to the driver in an axial direction whereby rotation of said member with respect to the driver forces the jaws to slide through the jaw holder in a direction to cause tightening of the jaws.

22. A chuck incorporating a driver, a jaw holder axially aligned therewith, jaws slidable in the jaw holder along axes intersecting one another on the axis of the jaw holder, the jaws being capable of rotation with respect to the driver, a sleeve rotatable but restrained against axial movement with respect to the jaw holder and axially movable but restrained against rotation with respect to said driver, a second sleeve threaded to the first sleeve and rotatable but restrained against axial movement with respect to the driver, cam means interposed between the driver and the jaws and rotatable with said jaws, the cam means including a member having a cam surface inclined to a plane normal to the axis of the jaw holder and in both directions from an intermediate area circumferentially of the chuck, the cam means including also a part cooperating with said surface and immovable with respect to the driver in an axial direction whereby rotation of said member in either direction with respect to the driver forces the jaws to slide through the jaw holder in a direction to cause tightening of the jaws.

23. A chuck incorporating a driver, a jaw holder axially aligned therewith, jaws slidable in the jaw holder along axes that intersect one another on the axis of the jaw holder, the jaws being capable of rotation with respect to the driver, a sleeve rotatable but restrained against axial movement with respect to the jaw holder and axially movable but restrained against rotation with respect to the driver, a second sleeve threaded to the first sleeve and rotatable but restrained against axial movement with respect to the driver, a pair of cams, one of which is attached to the driver and the other attached to the jaws so as to move axially and rotatively with the jaws, the adjacent ends of said cams having opposed cam surfaces that are inclined to a plane normal to the axis of the cams, and rolling members interposed between and in engagement with said opposed cam surfaces.

24. A chuck incorporating a driver, a jaw holder axially aligned therewith, jaws slidable in the jaw holder along axes that intersect one another on the axis of the jaw holder, a sleeve rotatable but restrained against axial movement with respect to the jaw holder and axially movable but restrained against rotation with respect to the driver, a second sleeve threaded to the first sleeve and rotatable but restrained against axial movement with respect to the driver, a pair of cam members, one of which members is incorporated in the driver and the other of which is attached to the jaws so as to move axially and rotatively with the jaws, each of said cam members having a plurality of cam surfaces in opposed relation to the cam surfaces of the other cam member, said cam surfaces being inclined to a plane normal to the axis of the cam members in a direction circumferentially of said members, rolling members interposed between the cam members in engagement with the cam surfaces thereof, and a spacer maintaining said rolling members in the same angular relation to one another as the cam surfaces of each member bear to one another.

LEE S. CHADWICK.

REFERENCES CITED

The following references are of record in the file of this patent:

UNITED STATES PATENTS

| Number | Name | Date |
|---|---|---|
| 1,011,975 | Lewis | Dec. 19, 1911 |
| 1,321,969 | Avis | Nov. 8, 1919 |
| 1,384,020 | Kupke | July 5, 1921 |
| 1,426,704 | Axelsson | Aug. 22, 1922 |
| 1,775,993 | Emrick | Sept. 16, 1930 |
| 1,776,675 | Bascom | Sept. 23, 1930 |